United States Patent Office 3,242,236
Patented Mar. 22, 1966

3,242,236
PROCESS FOR PREPARING TETRAALKYL ETHYLENEDIPHOSPHONATES
Kurt Moedritzer, Webster Groves, Mo., assignor to Monsanto Research Corporation, St. Louis, Mo., a corporation of Delaware
No Drawing. Filed Jan. 30, 1963, Ser. No. 255,089
2 Claims. (Cl. 260—970)

This invention relates to the preparation of alkylenediphosphonates, and more particularly provides a new and improved method of preparing tetraalkyl ethylenediphosphonates.

It is known that a general method of preparing tetraalkyl alkylenediphosphonates comprises reaction of a dialkyl sodiumphosphonate with a dialkyl haloalkylphosphonate, substantially according to the scheme:

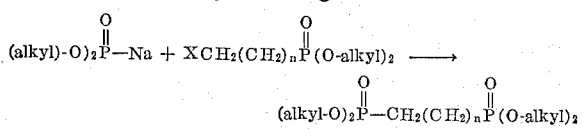

wherein X is halogen and $n$ is a number of zero to, say, 12. Generally the halogen may be bromine or chlorine. However, when $n$ is one, i.e., when the haloalkylphosphonate is a haloethylphosphonate, use of the chloro-compound, rather than of the bromo-compound results in little, if any, formation of the desired ethylenediphosphonate. Instead, there are obtained waxy to tar-like products which probably result from decomposition of the chloroethylphosphonate, the chlorine atom in the $\beta$-position with respect to the functional phosphonate group being highly labile. Even when, as the haloethylphosphonate reactant, there is used a mixture of 2-bromoethylphosphonate and 2-chloroethylphosphonate, yields of the ethylenediphosphonate are lower than would be expected from the normal participation of only the 2-bromoethylphosphonate component, alone; i.e., presence of the 2-chloroethylphosphonate in the mixture of 2-haloethylphosphonate reactant inhibits reactivity of the 2-bromo compound, probably through primary, very rapid formation of olefinic material from the 2-chloroethyl compound, and occluding effect of tars and other polymers which originate from the olefinic material. Since the other known method of preparing alkylenediphosphonates, i.e., the reaction of trialkyl phosphites with alkylenedihalides requires ethylene dibromide as the alkylenedihalide reactant, known methods for the preparation of the ethylenediphosphonates have necessitated a bromine-containing reactant. On the other hand, preparation of other alkylenediphosphonates, e.g., the tetraalkyl methylenediphosphonates can be effected readily by employing a chloro-reactant. For example, as reported by Petrov et al., Zhur. Obschei Khim., 30, 1602-8 (1960), Chemical Abstracts, 55, 1414 (1961), by refluxing diethyl chloromethylphosphonate with diethyl sodiumphosphonate there is obtained a 50% theoretical yield of tetraethyl methylenediphosphonate. As will be shown hereinafter, however, when a mixture of diethyl 2-chloroethylphosphonate and diethyl 2-bromoethylphosphonate is treated with diethyl sodiumphosphonate no sodium halide is given off in the cold, and even after refluxing for 24 hours there is only a very low conversion of the haloethylphosphonate to the ethylenediphosphonate.

Now I have found that tetraalkyl ethylenediphosphonates are readily prepared from dialkyl 2-chloroethylphosphonates when there is used a dialkyl potassiumphosphonate instead of the sodiumphosphonate as the alkali-containing reactant. Although alkali metal-containing reactants are generally regarded in the prior art to possess like efficiency in the field of organic phosphorus chemistry, it has not been generally held that a potassium compound can be used for a condensation reaction involving chlorine displacement where a sodium compound could not be used; nor has it been known that although generally either bromine or chlorine can be displaced in a condensation reaction involving an alkali metal reactant, for obtaining displacement of a $\beta$-chlorine, rather than of a $\beta$-bromine, there is a criticality involved in choice of the alkali metal. The dialkyl potassiumphosphonates serve the purpose, whereas the dialkyl sodiumphosphonates do not.

In preparing tetraalkyl ethylenephosphonates from the dialkyl 2-chloroethylphosphonates, I simply contact the 2-chloroethylphosphonate with the dialkyl potassiumphosphonate at ordinary, decreased, or increased temperatures and preferably in the presence of an inert, organic liquid diluent or solvent. Depending upon the nature of the individual reactant, upon whether or not a diluent is employed, and upon the nature of the diluent if one is used, temperatures of from, say, 0° C. to 100° C. may be used. Formation of the ethylenediphosphonate occurs substantially according to the scheme:

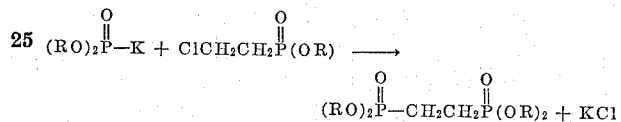

wherein R is a lower alkyl, say, an alkyl radical of from 1 to 6 carbon atoms.

Examples of the presently useful dialkyl potassiumphosphonates, $(RO)_2P(O)K$ are diethyl, dimethyl, dibutyl, dipentyl, diisopropyl, dihexyl, methyl propyl or butyl ethyl potassiumphosphonates. Examples of the 2-chloroethylphosphonates which react with the dialkyl potassiumphosphonates according to the invention are dimethyl, dipropyl, diisobutyl, dipentyl, dihexyl, methyl pentyl or ethyl hexyl 2-chloroethylphosphonate. The alkyl radical of the tetraalkyl ethylenediphosphonates thus prepared may be the same or different; e.g., by employing the present method there are obtained tetramethyl, tetrabutyl, tetrapentyl, O,O-diethyl O',O'-dipropyl, O,O-dihexyl O',O'-dipentyl, O-butyl O-ethyl O',O' - dimethyl, or O - isopropyl O - hexyl O' - butyl O'-methyl ethylenediphosphonate. The presently prepared ethylenediphosphonates are generally useful as plasticizers for vinyl resins and as lubricant additives.

Generally, reaction occurs almost upon contact of the dialkyl potassiumphosphonate with the dialkyl 2-chloroethylphosphonate. When an organic diluent is used, the rapidity of the reaction is evidenced by the rate at which the insoluble potassium chloride is formed. Owing to the ease of reaction, application of heat is not required; on the contrary, when working with large quantities of reactants, it is frequently advisable to operate at decreased temperature, e.g., with ice-cooling, in order to mitigate speed of reaction. The use of an inert organic liquid diluent or solvent serves not only to effectuate smooth reaction, but it also facilitates separation of the by-product potassium chloride. As such diluents or solvents there may be used, e.g., the paraffinic or aromatic hydrocarbons such as hexane, benzene, or toluene; nitro-substituted hydrocarbons such as 2-nitropropane or nitrobenzene; ethers such as ethyl ether or dioxane; halogenated hydrocarbons such as carbon tetrachloride or chlorobenzene; etc. The ethylenediphosphonate product is readily recovered from the reaction mixture by isolating procedures known to those skilled in the art, e.g., by decanting the organic phase from the by-product potassium chloride and then removing any diluent or unreacted material by fractional distillation.

Example 1

Potassium (35.7 g.) was placed in 500 ml. of ether, and 125.6 g. of diethyl phosphonate, $HP(O)(OCH_2CH_3)_2$, was slowly added thereto. When evidence of reaction had ceased, i.e., when hydrogen was no longer evolved, there was added to the resulting mixture of diethyl potassiumphosphonate, $KP(O)(OCH_2CH_3)_2$, and ether 183 g. (0.91 mole) of diethyl 2-chloroethylphosphonate, $$ClCH_2CH_2P(O)(OCH_2CH_3)_2$$

That reaction occurred was evidenced by almost immediate formation of potassium chloride. The whole was then centrifuged to separate the potassium chloride. The organic layer thus formed was decanted and the potassium chloride was washed with ether. Distillation of the combined washings and organic layer gave 166 g. of the substantially pure tetraethyl ethylenediphosphonate, B.P. 125–134° C./0.05 mm., and having a nuclear magnetic resonance chemical shift at −27.1 p.p.m.

Example 2

This example shows the inefficacy of employing a sodiumphosphonate with a mixture of 2-haloethylphosphonates, including 2-chloroethylphosphonate.

A mixture consisting of 705 g. (2.87 moles) of diethyl 2-bromoethylphosphonate, $BrCH_2CH_2P(O)(OCH_2CH_3)_2$, and 125 g. (0.62 mole) of diethyl 2-chloroethylphosphonate, $ClCH_2CH_2P(O)(OCH_2CH_3)_2$, and thus amounting to a total of 3.49 moles of diethyl 2-haloethylphosphonate was treated in 1500 ml. of ether with 3.49 moles of diethyl sodiumphosphonate, $NaP(O)(OCH_2CH_3)_2$, which had been prepared from 489 g. of diethyl phosphonate $HP(O)(OCH_2CH_3)_2$ and sodium in ether. Since no reaction was evidenced at ordinary temperature, the whole was gradually heated to reflux to induce reaction. But only very little formation of sodium chloride was noticed, even after 24 hours of reflux. After evaporating the ether, the residue contained an ether-insoluble, yellow, putty-like material. This was removed from the reaction mixture and extracted several times with ether. The residue was hydrolyzed with water and also extracted with ether. Distillation of the combined extracts yielded mainly diethyl phosphonate and diethyl 2-bromoethylphosphonate and only 85 g. (0.28 mole) of tetraethyl ethylenediphosphonate, $$(CH_3CH_2O)_2P(O)CH_2CH_2P(O)(OCH_2CH_3)_2$$

Based on the diethyl 2-haloethylphosphonate which was employed, this represents only an 8% theoretical yield.

The low yield of diphosphonate which was obtained above was probably due to ethylene formation during the reaction and to formation of large amounts of tar-like residue upon distillation. When working with only the 2-chloroethylphosphonate, instead of with the mixture of 2-chloroethylphosphonate and 2-bromoethylphosphonate, substantially no ethylenediphosphonate is obtained.

Since formation of the ethylene diphosphonate proceeds by condensation of one mole of the dialkyl potassiumphosphonate with one mole of the dialkyl 2-haloethylphosphonate, the two reactants are advantageously used in equimolar proportions. However, any excess of either may be employed, since such excess is readily recovered from the reaction mixture after formation of the tetraalkyl ethylenediphosphonate.

What I claim is:

1. The method which comprises contacting, in the presence of an inert, organic liquid diluent, a phosphorus compound of the formula $$(RO)_2\overset{O}{\underset{\|}{P}}-K$$

wherein R is alkyl of from 1 to 6 carbon atoms, with a phosphonate of the formula $$ClCH_2CH_2\overset{O}{\underset{\|}{P}}(OR')_2$$

wherein R' is alkyl of from 1 to 6 carbon atoms and recovering from the resulting reaction product a diphosphonate of the formula $$(RO)_2\overset{O}{\underset{\|}{P}}-CH_2CH_2-\overset{O}{\underset{\|}{P}}(OR')_2$$

wherein R and R' are as herein defined.

2. The method which comprises contacting diethyl potassiumphosphonate with diethyl 2-chloroethylphosphonate in the presence of an inert, organic liquid diluent, and recovering tetraethyl ethylenediphosphonate from the resulting reaction product.

References Cited by the Examiner

UNITED STATES PATENTS 2,599,761  6/1952  Harman et al. _ 260—461.310 XR
2,634,288  4/1953  Boyer et al. _____ 260—461.303

OTHER REFERENCES

Petrov et al., "Chem. Abst.," vol. 55, col. 1414 (Jan. 23, 1961).

CHARLES B. PARKER, *Primary Examiner.*

NICHOLAS S. RIZZO, *Examiner.*